(No Model.)
W. T. KOSINSKI.
DEVICE FOR CONVERTING RECIPROCATING INTO ROTARY GRIP AND SLIP MOTION.
No. 334,392.  Patented Jan. 12, 1886.
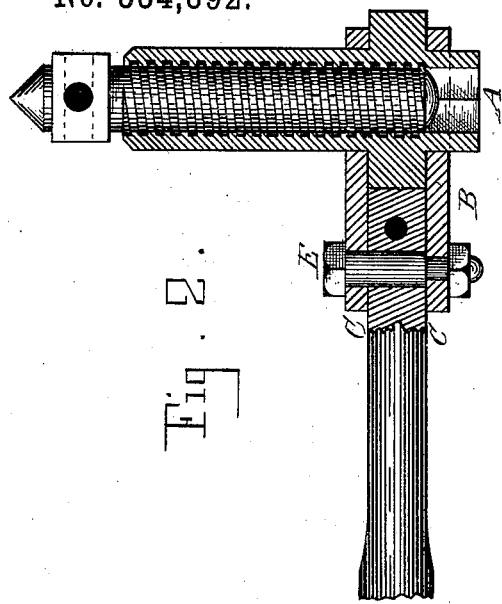
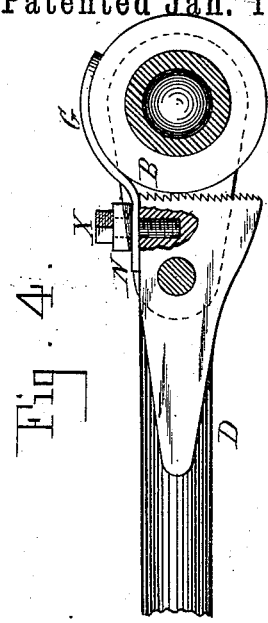
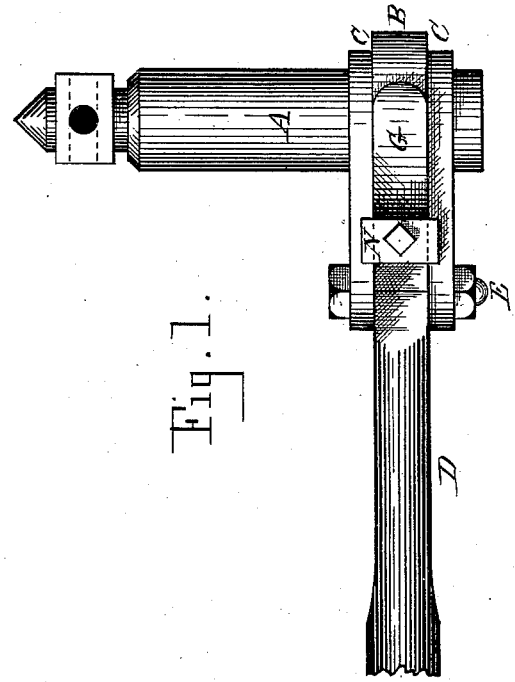
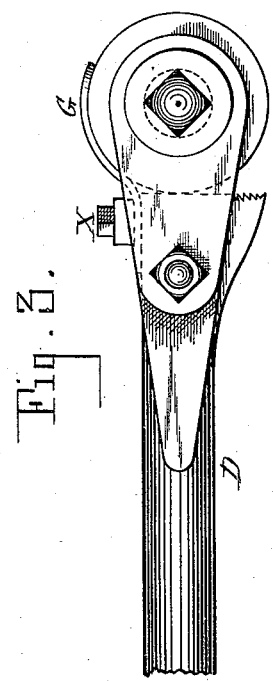
Witnesses
John C. Miller
Percy White
Inventor
W. T. Kosinski

UNITED STATES PATENT OFFICE.

WLADYSLAW THEODORE KOSINSKI, OF BROOKLYN, NEW YORK.

DEVICE FOR CONVERTING RECIPROCATING INTO ROTARY GRIP AND SLIP MOTION.

SPECIFICATION forming part of Letters Patent No. 334,392, dated January 12, 1886.

Application filed November 11, 1885. Serial No. 182,470. (No model.)

*To all whom it may concern:*

Be it known that I, WLADYSLAW THEODORE KOSINSKI, a citizen of the State of New York, and a resident of Brooklyn, Kings county, New York, have invented certain new and useful Improvements in Devices for Converting Reciprocating into Rotary Grip and Slip Motion, of which the following is a specification.

In the accompanying drawings, Figure 1 represents a plan view. Fig. 2 represents a side view. Fig. 3 represents a cross-section. Fig. 4 represents a detail.

My invention refers to a device for converting reciprocating into rotary motion.

The invention consists in the rotary grip and slip motion, as hereinafter fully described, and is applicable to drills, screw-jacks, wrenches, vises, &c.

A represents the chuck, carrying a collar, B. C C are the face-plates. D is the lever, serrated on its face and held onto the side plates by bolt E. The frictional or adjustable pressure-spring G is of flat or round steel. Its heel is perforated to admit the screw X, to be secured to the lever E by cross-bar N. The spring G is applied direct to and bears on the periphery of the collar B, and the heel end thereof and the cross stay-bar are embedded between the side plates, D, in order to prevent displacement of the spring. The cross-bar N serves as an adjustment to the lever and spring, thereby preventing loss of motion in rotating the mechanism.

The device is adapted to be used either right or left by merely shifting the lever from one to the other side.

I claim as new—

1. The above-described grip and slip motion device, consisting of the serrated lever, side plates, chuck passing through the side plates, said chuck carrying a collar, and a spring connected to the lever, secured by a cross stay-bar, as described.

2. The combination of the lever, spring, and cross stay-bar with the screw X, as described.

In testimony that I claim the foregoing as my invention I have signed my name, in presence of two witnesses, this 6th day of May, 1885.

WLADYSLAW THEODORE KOSINSKI.

Witnesses:
EMIL J. EWALD,
STANISLAW KRZEMII SKI.